United States Patent
Lee et al.

(10) Patent No.: US 7,959,894 B2
(45) Date of Patent: Jun. 14, 2011

(54) FLAKY ALPHA-ALUMINA CRYSTAL AND A METHOD OF ITS PREPARATION

(75) Inventors: Jung Min Lee, Daejeon (KR); Byung Ki Park, Daejeon (KR); Jeong Kwon Suh, Daejeon (KR); Kil Wan Chang, Cheongju-si (KR); Kwang Su Lim, Cheongju-si (KR); Sung Yun Jo, Cheongju-si (KR); Kwang Choong Kang, Cheongju-si (KR)

(73) Assignees: Korea Research Institute of Chemical Technology, Daejeong (KR); CQV Co., Ltd., Chungcheongbuk-Do (KR)

( * ) Notice: Subject to any disclaimer, the term of this patent is extended or adjusted under 35 U.S.C. 154(b) by 759 days.

(21) Appl. No.: 11/886,507

(22) PCT Filed: Jan. 26, 2006

(86) PCT No.: PCT/KR2006/000307
§ 371 (c)(1),
(2), (4) Date: Sep. 17, 2007

(87) PCT Pub. No.: WO2006/101306
PCT Pub. Date: Sep. 28, 2006

(65) Prior Publication Data
US 2009/0186225 A1    Jul. 23, 2009

(30) Foreign Application Priority Data

Mar. 25, 2005    (KR) .................. 10-2005-0025126

(51) Int. Cl.
C01F 7/02    (2006.01)
C01F 7/34    (2006.01)
(52) U.S. Cl. ............................................. 423/625
(58) Field of Classification Search .............. 423/625, 423/626, 600
See application file for complete search history.

(56) References Cited

U.S. PATENT DOCUMENTS 7,067,157 B2 *    6/2006    Fukuda et al. ............... 424/682
7,858,067 B2 *    12/2010    Maki et al. ................... 423/625

FOREIGN PATENT DOCUMENTS

GB    1 286 003    8/1972
JP    07-331110    12/1995

* cited by examiner

*Primary Examiner* — Wayne Langel
(74) *Attorney, Agent, or Firm* — Frommer Lawrence & Haug LLP; Ronald R. Santucci

(57) ABSTRACT

The present invention relates to a flaky α-alumina crystal and a preparation method thereof. More particularly, the present invention relates to a flaky α-alumina crystal comprising aluminum oxide and zinc oxide, which is prepared by hydrolyzing an aluminum precursor solution containing a water-soluble flux and a zinc precursor solution to obtain a gel mixture and aging, drying, calcining and crystallizing it under a specific reaction condition, and a preparation method thereof. Since the flaky α-alumina crystal of the present invention has a thickness of less than 0.5 μm, an average particle diameter of at least 15 μm and an aspect ratio of at least 50, it is useful as high-quality pearlescent pigment material and filler for ceramic materials.

7 Claims, 5 Drawing Sheets

FLAKY ALPHA-ALUMINA CRYSTAL AND A METHOD OF ITS PREPARATION

This application is a 371 of PCT/KR2006/000307 filed on Jan. 26, 2006, published on Sep. 28, 2006 under publication number WO 2006/101306 A1 which claims priority benefits from Korean Patent Application No. 10-2005-0025126 filed Mar. 25, 2005, the disclosure of which is hereby incorporated by reference.

BACKGROUND OF THE INVENTION

1. Field of the Invention

The present invention relates to a flaky α-alumina crystal and a preparation method thereof. More particularly, the present invention relates to a flaky α-alumina crystal comprising aluminum oxide and zinc oxide, which is prepared by hydrolyzing an aluminum precursor solution containing a water-soluble flux and a zinc precursor solution to obtain a gel mixture and then aging, drying, calcining and crystallizing it under a specific reaction condition, and a preparation method thereof. Since the flaky α-alumina crystal of the present invention has a thickness of less than 0.5 μm, an average particle diameter of at least 15 μm and an aspect ratio of at least 50, it is useful as a high-quality pearlescent pigment material and filler for ceramic materials.

2. Description of the Related Art

Ceramic is a collective term referring non-metal inorganic solid materials prepared by heat-treatment at a relatively high temperature. In general, the ceramic provides special properties such as superior resistance to fire, acid and alkali. Of the ceramic materials, fillers and pearlescent pigments are required to be flaky and have uniform size and thickness, with little interparticle coagulation and smooth surface.

Improved thermal conductivity and mechanical strength are prerequisites for a good filler used as a ceramic material. For this, it is preferable that the filler is thin, has no interparticle coagulation for uniform dispersion and distribution, and also has a uniform particle size.

The important factors of a material for a pearlescent pigment are particle size, shape, surface property, refractive index, and the like. Since large and small particles have different proportions of reflection and transmission of light on the particle surface, uniformness in particle size is essential for a vivid and uniform color. Also, the particle size greatly affects the coloration of the pearlescent pigment because it is closely related with the wavelength of light. That is, the smaller the particle, the larger the surface area, thereby increasing the coloration and enhancing reflectivity, and offering a more vivid color. However, in coating metals or metal oxides, it is usually not easy to provide uniform coatings on them and thus results in decrease in aspect ratio, which then reduces the effect of light interference thus deteriorating glossiness of the resulting pearlescent colors. Therefore, in order to realize the various pearlescent colors caused by interference of light, the particle size needs to be sufficiently uniform. Besides, the pearlescent pigment material should be a transparent particle having uniform thickness and smooth surface. These two factors are greatly associated with obtaining the pearlescent color via coloration and cover-up. If the particles are thick or the surface is not smooth, most of light is reflected or scattered on the surface, and thus it becomes difficult to obtain the pearlescent color. Meanwhile, if the particles are coagulated or have non-uniform thickness, it is difficult to obtain various pearlescent colors when coated with metals or metal oxides. It is recommended that the flaky α-alumina crystal used as pearlescent pigment be transparent and has a thickness of less than 0.5 μm, an average particle size of 15-25 μm and a very smooth surface with no coagulation.

At present, lead carbonate, bismuth oxychldoride (BiOCl), natural mica, synthetic mica, etc., are used as a pearlescent pigment material. Of these, mica is also used as a modifier for improving ductility and mechanical strength of ceramic materials and as an additive for improving thermal conductivity.

Recently, methods of preparing flaky alumina prepared by hydrothermal method or by adding titanium dioxide have been reported.

The hydrothermal method is problematic in that the particle size is small and the aspect ratio is low. The method of using titanium dioxide as an additive provides superior prosperities for a pearlescent pigment. However, it is difficult to obtain a flaky alumina crystal having superior particle size distribution and dispersibility because aging is not performed after hydrolysis while calcinations is not performed before crystallization.

Generally, flaky alumina is formed as follows. Pseudo-boehmite, which is formed from hydrolysis of an aluminum salt solution, undergoes a phase transition to γ-alumina (γ-$Al_2O_3$) at a temperature of about 400° C. or higher. If the melt salt solution is heated to 1,200° C., a hexagonal, flaky crystal of α-alumina is obtained as a result. The flaky α-alumina crystal needs to have a thin and uniform plane and an aspect ratio (diameter/thickness) of at least 50 and be transparent, so that it can provide pearlescent gloss of various colors when coated with metals or metal oxides. However, because the flaky crystal prepared by the conventional method is rather thick and small, it is not good for being used as a pearlescent pigment.

SUMMARY OF THE INVENTION

The inventors of the present invention worked to solve the structural problem of the flaky alumina crystal widely used as a conventional pearlescent pigment. In doing so, the inventors found a novel flaky α-alumina crystal comprising aluminum oxide and zinc oxide and having a thickness of less than 0.5 μm, an average particle diameter of at least 15 μm and an aspect ratio of at least 50.

The inventors also found out that the flaky α-alumina crystal of the present invention is prepared by hydrolyzing an aluminum precursor solution containing a water-soluble flux and a zinc precursor solution to prepare a gel mixture; and aging, drying, calcining and crystallizing it under a specific reaction condition.

Therefore, in an embodiment of the present invention, there is provided a novel flaky α-alumina crystal comprising aluminum oxide and zinc oxide as main constituents.

In another embodiment of the present invention, there is provided a method for preparing the novel flaky α-alumina crystal by hydrolyzing, aging, drying, calcining and crystallizing an aluminum precursor solution and a zinc precursor solution.

BRIEF DESCRIPTION OF THE DRAWINGS

The aforementioned aspect and other features of the present invention will be explained in the following detailed description, taken in conjunction with the accompanying drawings, wherein.

DETAILED DESCRIPTION OF THE PREFERRED EMBODIMENTS

The present invention relates to a flaky α-alumina crystal comprising aluminum oxide and zinc oxide as main constituents.

The present invention also relates to a method for preparing a flaky α-alumina crystal comprising:

(a) mixing 100 parts by weight of an aluminum precursor solution containing a water-soluble flux with a zinc precursor solution containing 0.04-5 parts by weight of a zinc precursor per 100 parts by weight of the aluminum precursor to prepare a metal precursor solution;

(b) titrating the metal precursor solution with a sodium salt solution to pH 6.0-7.5 and hydrolyzing the solution to prepare a gel mixture;

(c) pre-treating the gel mixture by aging the mixture at 60-100° C. for 5-30 hrs followed by drying;

(d) calcining the pre-treated gel mixture at 300-700° C. for 1-5 hrs;

(e) crystallizing the calcined gel mixture at 1,000-1,200° C. for 1-7 hrs to prepare a crystallized cake; and (f) cooling the crystallized cake to room temperature, dissolving it in water of 20-90° C. and filtering the solution to remove the flux, dispersing the solution with a 0.1-10% sulfuric acid solution of 20-90° C. and filtering, washing and drying the solution.

Hereunder is given a detailed description of the present invention.

The present invention relates to a novel flaky α-alumina crystal comprising aluminum oxide and zinc oxide as main constituents. The zinc oxide is distributed on the aluminum crystal surface, thereby reducing thickness, promoting particle growth and preventing coagulation. The flaky α-alumina crystal has a thickness of less than 0.5 μm, preferably 0.1-0.5 μm; an average particle diameter of at least 15 μm, preferably 15-25 μm; and an aspect ratio of at least 50, preferably 50-250, thus being useful as a pearlescent pigment.

Figure 1:
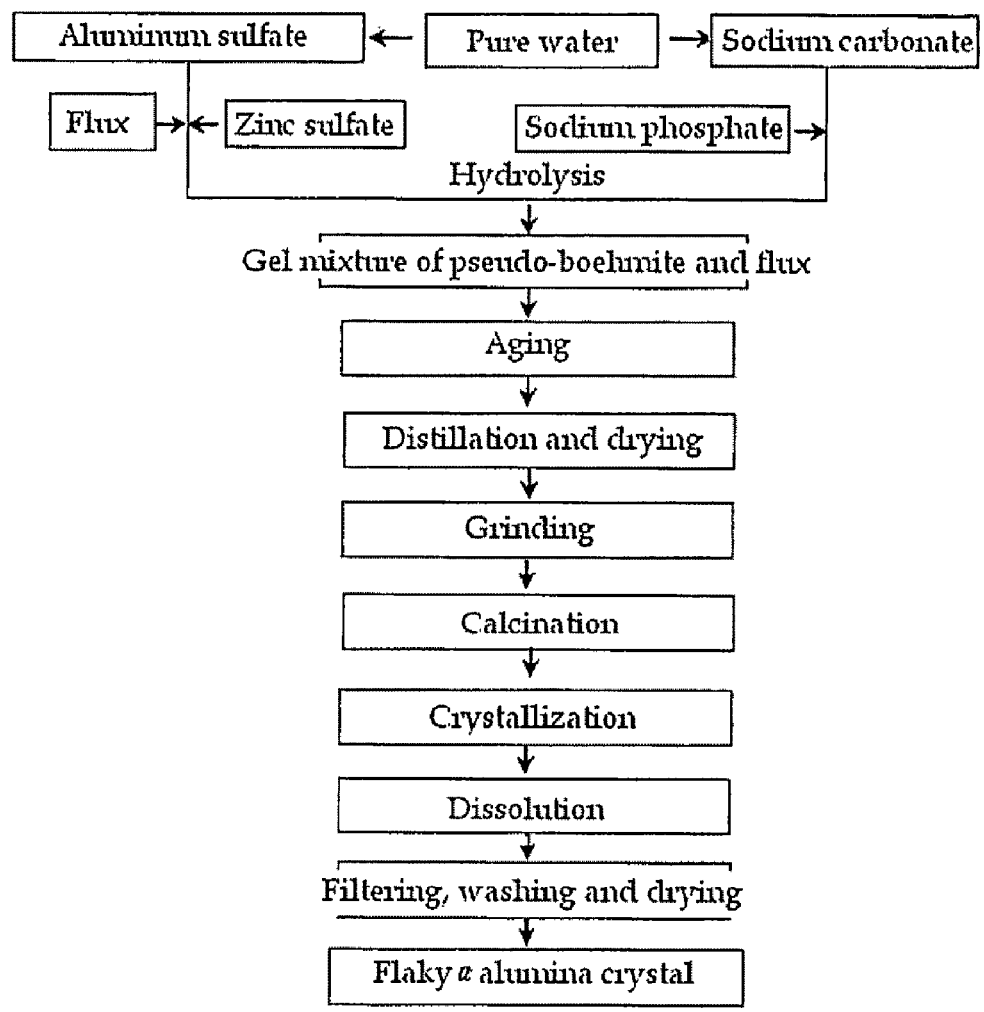
FIG. 1 illustrates the preparation process of the flaky α-alumina crystal in accordance with the present invention.

FIG. 1 illustrates the preparation process of the flaky α-alumina crystal in accordance with the present invention.

First, an aluminum precursor solution containing a water-soluble flux is mixed with a zinc precursor solution to prepare a metal precursor solution.

As for the aluminum precursor, any one commonly used in the related art may be used. For example, an acid salt, halide or oxide of aluminum, more specifically, aluminum sulfate, aluminum nitrate or aluminum chloride may be used.

As for the zinc precursor, any one commonly used in the related art may be used. For example, an acid salt, halide or oxide of zinc, more specifically, zinc sulfate, zinc nitrate or zinc chloride may be used. For example, aluminum sulfate, which has advantages in hydrolysis property, chemical affinity with the flux and formation of a water-soluble salt after crystallization for easier separation from the flaky crystal, and zinc sulfate, which has good chemical affinity with aluminum sulfate and is effective in reducing thickness of the flaky crystal and preventing coagulation, are used as the precursors. Zinc sulfate is oxidized to zinc oxide at a temperature of 300° C. or higher. The zinc oxide is adhered to the crystal face of flaky α-alumina during crystallization, inhibiting growth on the (0001) face having a large surface energy and promoting growth on the $(2\bar{1}\bar{1}0)$, $(11\bar{2}0)$ and $(\bar{1}2\bar{1}0)$ faces having relatively small surface energies. Because of this epitaxial growth, growth along the thickness direction is inhibited while growth along the diameter direction is promoted, thus generating a thinner but larger flaky alumina crystal. Also, because the thickness varies depending on the amount of zinc oxide, it is possible to prepare flaky α-alumina crystals with different aspect ratios.

The aluminum precursor and the zinc precursor are preferably used in the state of an aqueous solution in the range of 15-35% and 20-50%, respectively. If the composition is off the above range, hydrolysis, drying, prevention of coagulation of the flaky α-alumina crystal and control of size and aspect ratio become difficult.

The zinc precursor is used in 0.04-5 parts by weight per 100 parts by weight of the aluminum precursor. If less than 0.04 part by weight of zinc precursor is used, prevention of coagulation of the flaky α-alumina crystal is difficult and aspect ratio decreases because of increase of thickness. In contrast, if it is used more than 5 parts by weight, the excessive zinc oxide functions as impurities during crystallization, promoting non-uniform nucleation and resulting in smaller crystals.

The water-soluble flux transforms the solid state into the liquid state for easier nucleation and nuclear growth. In the molten salt, solute molecules or atoms are coagulated to form seeds and nucleation and nuclear growth by diffusion are followed, controlled by surface free energy and volume free energy. The nucleation of the flaky α-alumina crystal is classified into the typical homogeneous nucleation, in which nucleation is accomplished by the diffusion of atoms in the molten salt solution depending on the supersaturation of the solution, and the heterogeneous nucleation, in which nucleation occurs on the surface of the container or other solids or impurities. However, as in most nucleations, the nucleation of the flaky α-alumina crystal is accomplished by heterogeneous nucleation. Since the nucleation occurs on the surface of solid, i.e., on the surface of a crucible or impurity particles, the interfacial energy is much smaller than that for the homogeneous nucleation, which reduces activation energy. In the heterogeneous nucleation, the activation energy varies much depending on the wetting angle, which contacts solution with the solid surface. In general, the smaller the wetting angle, the easier the nucleation. However, nucleation is often not accomplished easily even with a small wetting angle. This is because chemical affinity on the surface or other physical properties are more important than the wetting angle. Nucleation is accomplished more easily if there are fine pores or crevices on the solid surface, rather than a smooth surface, and if the nucleation seed is chemically compatible with the solid surface.

The heterogeneous nucleation occurs either by nucleation on the surface of the crucible or impurity particles or by growth along a specific direction so-called 'epitaxial growth'.

The water-soluble flux to be used in the present invention is not particularly limited but may use one commonly used in the related art. Any one having superior chemical affinity with the aluminum precursor, capable of forming a molten salt easily even at low temperature and being easily dissolved in water after crystallization, may be used. For example, a water-soluble flux selected from sodium sulfate, potassium sulfate, potassium hydrogen sulfate, sodium borate, potassium nitrate and potassium hydroxide may be used. The water-soluble flux is used in the range of 80-120 parts by weight per 100 parts by weight of the aluminum precursor. If the content of the water-soluble flux is below 80 parts by weight, formation of the molten salt and growth of the flaky α-alumina crystal are difficult. In contrast, if it exceeds 120 parts by weight, particle size and aspect ratio of the flaky α-alumina crystal tend to decrease.

Next, the metal precursor solution is titrated with a sodium salt solution to pH 6.0-7.5 and hydrolyzed to prepare a gel mixture.

The sodium salt solution to be used in the present invention is not particularly limited but may use one commonly used in the related art. For example, at least one selected from sodium carbonate, sodium hydrogencarbonate, sodium hydroxide and sodium phosphate may be used.

Subsequently, the prepared gel mixture is pre-treated by aging and drying. The aging is performed at 60-100° C. for 5-30 hrs. If the aging temperature is below 60° C., the pseudo-boehmite crystal included in the gel mixture does not grow well. In contrast, if it exceeds 100° C., the flaky crystal is not formed well because of the structural change of the pseudo-boehmite resulting from hydrothermal reaction. In addition, if the aging time is less than 5 hrs, it is difficult to obtain a uniform gel mixture and the pseudo-boehmite does not grow well, resulting in a severely coagulated flaky α-alumina crystal. In contrast, if the aging time exceeds 30 hrs, a thick flaky α-alumina crystal is obtained because of excessive growth of the pseudo-boehmite.

In the afore-mentioned mixing, hydrolysis and aging processes, the pseudo-boehmite is formed and grown and the gel mixture is dispersed uniformly. Further, formation of the flaky crystal by the coagulation of acicular α-alumina is promoted during the crystallization process and distribution of the zinc oxide on the surface of the flaky α-alumina crystal is induced, resulting in reduction of thickness, promotion of particle growth and prevention of coagulation.

Next, the pre-treated gel mixture is calcined. The calcinations is performed at 300-700° C. for 1-5 hrs. If the calcination temperature is below 300° C., complete removal of structural water contained in crystal is impossible. In contrast, if it exceeds 700° C., a non-uniform flaky crystal is obtained because of coagulation of the pseudo-boehmite during the removal of crystalline water.

In the calcination process, moisture generated from the removal of the crystalline water has to be removed sufficiently, in order to prevent its catalytic action during the crystallization.

Subsequently, the calcined gel mixture is crystallized. The crystallization is performed at 1,000-1,200° C. for 1-7 hrs. If the crystallization temperature is below 1,000° C., a flaky α-alumina crystal cannot be obtained. In contrast, if it exceeds 1,200° C., maintenance of the molten salt becomes difficult because sulfur leaves from the flux, resulting in coagulation of the flaky crystal and increase in energy consumption.

In the crystallization process, a sufficiently large flaky crystal has to be formed by the coagulation of acicular particles prior to phase transition to α-alumina, so that a uniform molten salt with no thermal gradient can be obtained.

The crystallized cake is cooled, washed and dried by the common methods used in the related art. In the present invention, the crystallized cake is cooled to room temperature, dissolved in water at 20-90° C. and filtered to remove the flux, dispersed in 0.1-10% sulfuric acid solution at 20-90° C. and then filtered and dried to obtain the flaky α-alumina crystal. If the concentration of the sulfuric acid solution is below 0.1%, the flaky α-alumina crystal is not dispersed well. In contrast, if it exceeds 10%, no more dispersion occurs while the cost of disposing of the waste solution increases.

The resultant flaky α-alumina crystal, which comprises aluminum oxide and zinc oxide as main constituents, has a thickness of less than 0.5 μm, an average particle diameter of at least 15 μm and an aspect ratio of at least 50. Thus, it has superior properties to be used as a high-quality pearlescent pigment and a filler for ceramic materials.

EXAMPLES

Hereinafter, the present invention is described in further detail through examples. However, the following examples are only for the understanding of the present invention and they should not be construed as limiting the scope of the present invention.

Example 1

Figure 2:
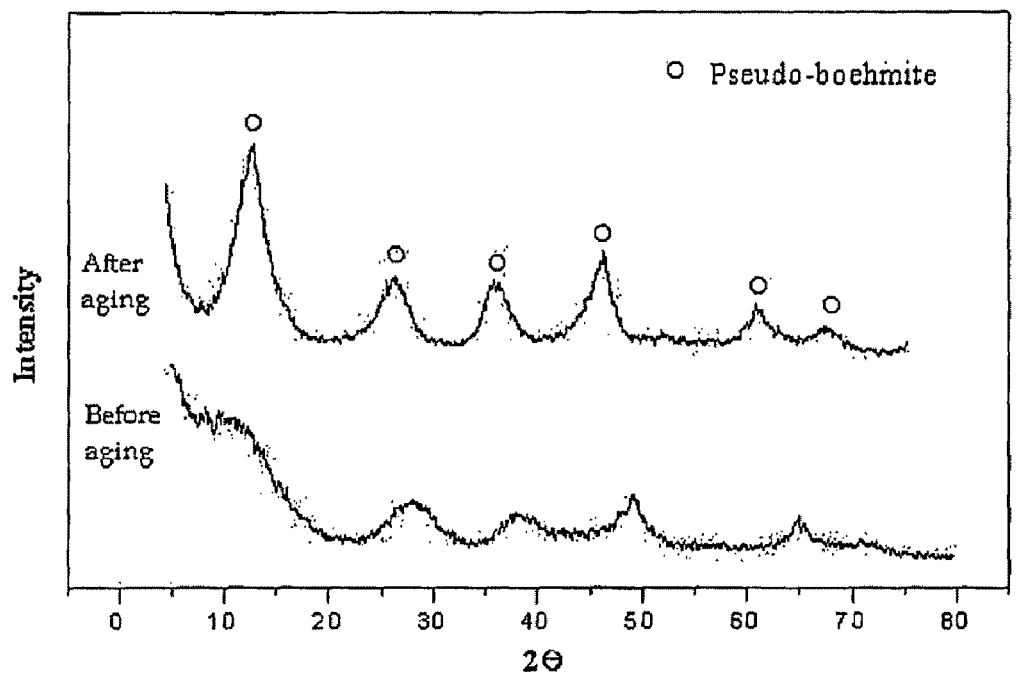
FIG. 2 shows the X-ray diffraction patterns of the hydrolyzed gel mixture of Example 1 in accordance with the present invention before and after aging in accordance with the present invention.

1,266.67 g of 27% aluminum sulfate solution as $Al_2(SO_4)_3$, 345 g of sodium sulfate ($Na_2SO_4$), 280 g of potassium sulfate ($K_2SO_4$) and 6 g of a 35% zinc sulfate ($ZnSO_4.7H_2O$) solution was added to a 5 L reactor containing 1,204.73 mL of pure water. A homogeneous mixture solution was obtained by mixing at 65° C. An alkali solution was prepared by dissolving 320 g of sodium carbonate ($Na_2CO_3$) and 2.7 g of sodium phosphate (($NaPO_3)_6$) in 900 mL of distilled water at 65° C. The aluminum sulfate mixture solution was titrated with the alkali solution at a rate of 20 mL/min, while stirring, to pH 6.8. A gel mixture of pseudo-boehmite and flux was obtained. Then, the gel mixture was aged at 90° C. for 20 hrs, distilled under vacuum at 60° C. and dried at 110° C. for 20 hrs. FIG. 2 shows the X-ray diffraction patterns before and after the aging.

The dried gel mixture was ground to a size less than about 5 mm and calcined in a 2 L alumina crucible at 500° C. for 1 hr to sufficiently remove moisture in the form of crystalline water. Then, the temperature was elevated to 930° C. and maintained at the above temperature for 30 min, so that a homogeneous molten salt could be formed and a flaky crystal could be formed well by the coagulation of acicular γ-alumina particles. Subsequently, crystallization was performed at 1,150° C. for 5.5 hrs to obtain a flaky α-alumina crystal. The crucible was cooled to room temperature and the flux was dissolved in 60° C. of water. Then, the flux was separated from the flaky α-alumina crystal by filtering.

Figure 5:
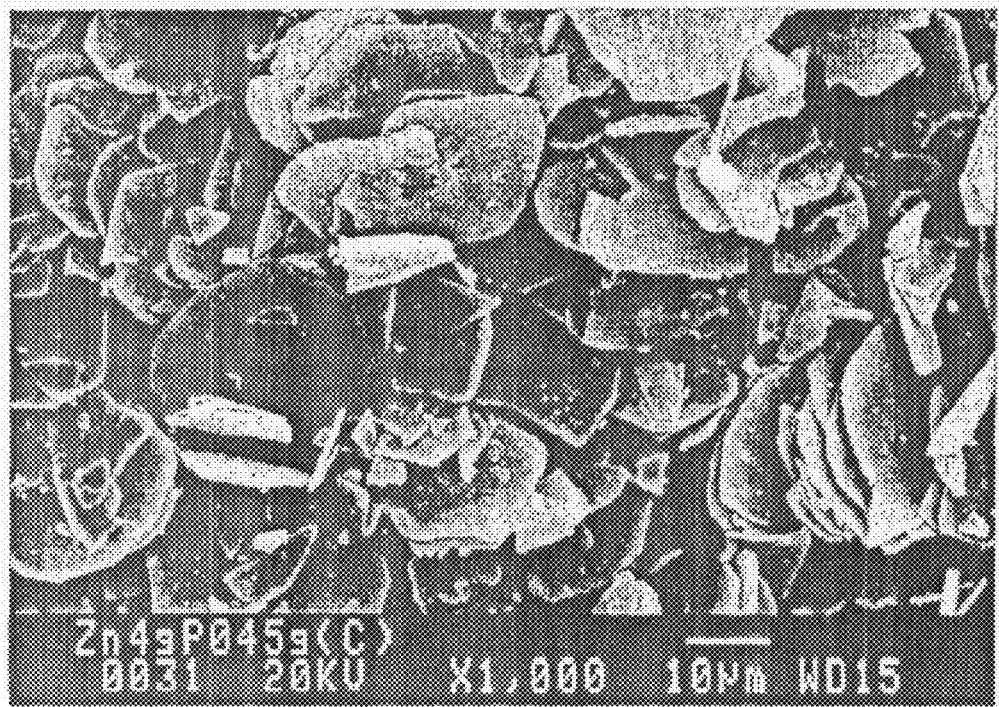
FIG. 5 is the electron micrograph showing the particle shape of the flaky α-alumina crystal of Example 1 in accordance with the present invention.

The flaky α-alumina crystal was put in a 5 L reactor together with 3,000 L of a 0.5% sulfuric acid solution. The particles were stirred at 60° C. for 48 hrs for complete dispersion. The mixture was filtered again, washed with water and dried at 100° C. A transparent flaky α-alumina having a thickness of 0.1-0.3 μm and an average particle size of 15.6 μm was obtained (see the electron micrographs of FIG. 5 and FIG. 6). Elemental analysis confirmed that the crystal was comprised of 0.5 part by weight of zinc oxide.

Figure 3:
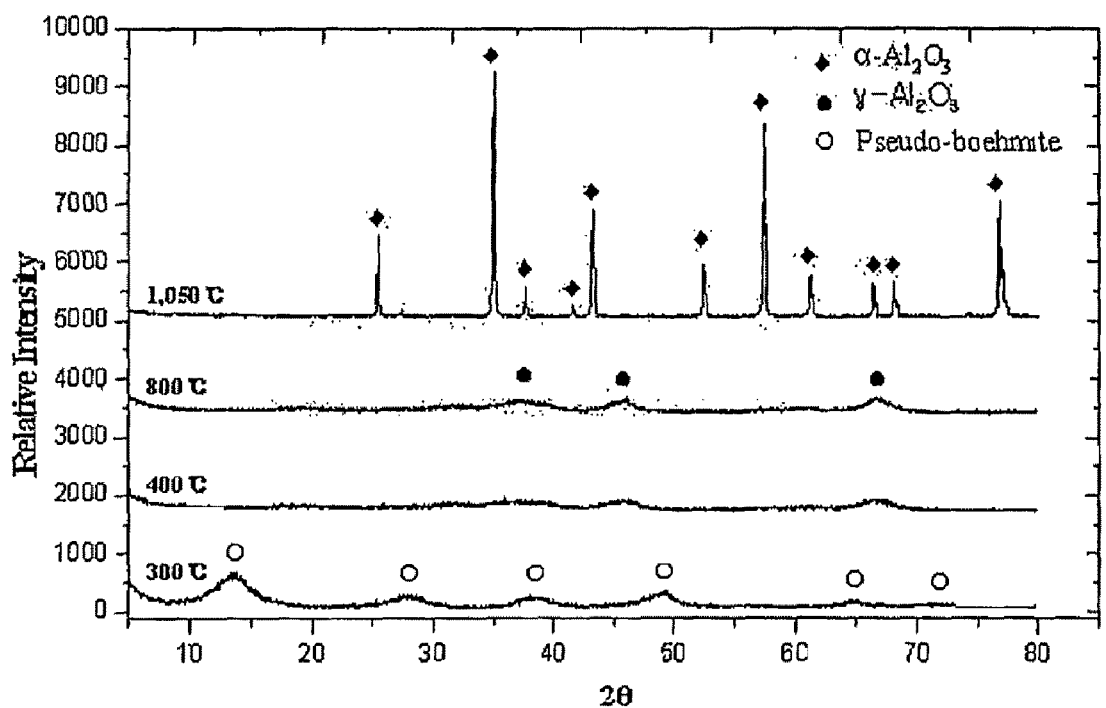
FIG. 3 shows the X-ray diffraction patterns of the flaky α-alumina crystal of Example 1 in accordance with the present invention at various temperatures.
Figure 4:
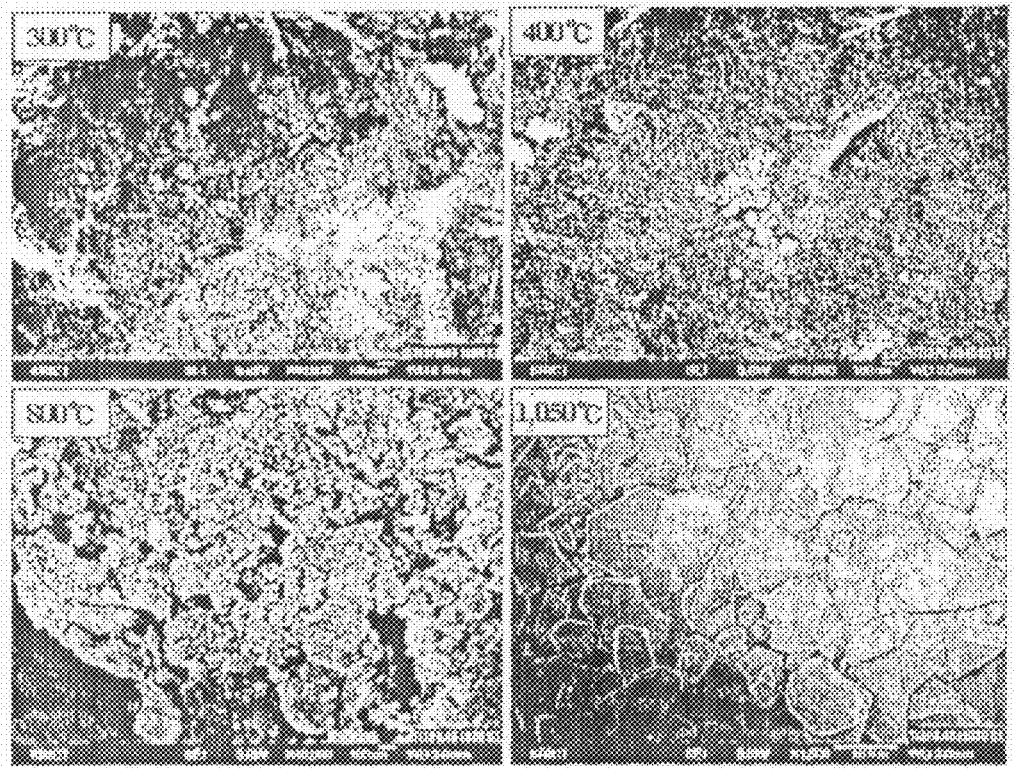
FIG. 4 shows the electron micrographs showing the change of particle shape of the flaky α-alumina crystal of Example 1 in accordance with the present invention at various temperatures.

FIG. 3 shows the X-ray diffraction patterns of the flaky α-alumina crystal at various temperatures. Change in crystal structure can be confirmed from the figure. FIG. 4 shows the electron micrographs showing the change of particle shape of the flaky α-alumina crystal at various temperatures. It can be confirmed that the flaky α-alumina crystal develops by the coagulation of acicular particles as temperature increases.

Example 2

A transparent flaky α-alumina crystal was prepared in the same manner as in Example 1, except for using 12 g of 35% zinc sulfate.

The resultant flaky α-alumina crystal had a thickness of 0.1-0.3 μm and an average particle size of 15.3 μm. Elemental analysis confirmed that the crystal was comprised of 1.05 part by weight of zinc oxide.

Example 3

A transparent flaky α-alumina crystal was prepared in the same manner as in Example 1, except for using 18 g of 35% zinc sulfate.

The resultant flaky α-alumina crystal had a thickness of 0.1-0.3 μm and an average particle size of 18 μm. Elemental analysis confirmed that the crystal was comprised of 1.52 part by weight of zinc oxide.

Example 4

A transparent flaky α-alumina crystal was prepared in the same manner as in Example 1, except for using 24 g of 35% zinc sulfate.

The resultant flaky α-alumina crystal had a thickness of 0.1-0.3 μm and an average particle size of 20.5 μm. Elemental analysis confirmed that the crystal was comprised of 2.05 parts by weight of zinc oxide.

Example 5

A transparent flaky α-alumina crystal was prepared in the same manner as in Example 1, except for using 30 g of 35% zinc sulfate.

Figure 6:
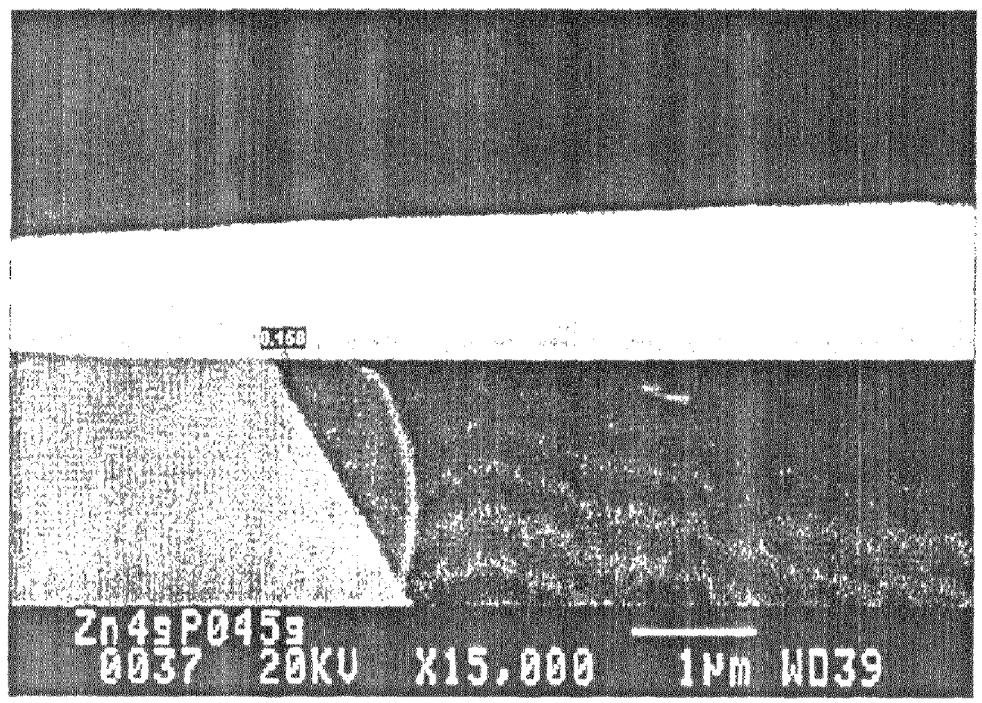
FIG. 6 is the electron micrograph showing the thickness of the flaky α-alumina crystal of Example 1 in accordance with the present invention.
Figure 7:
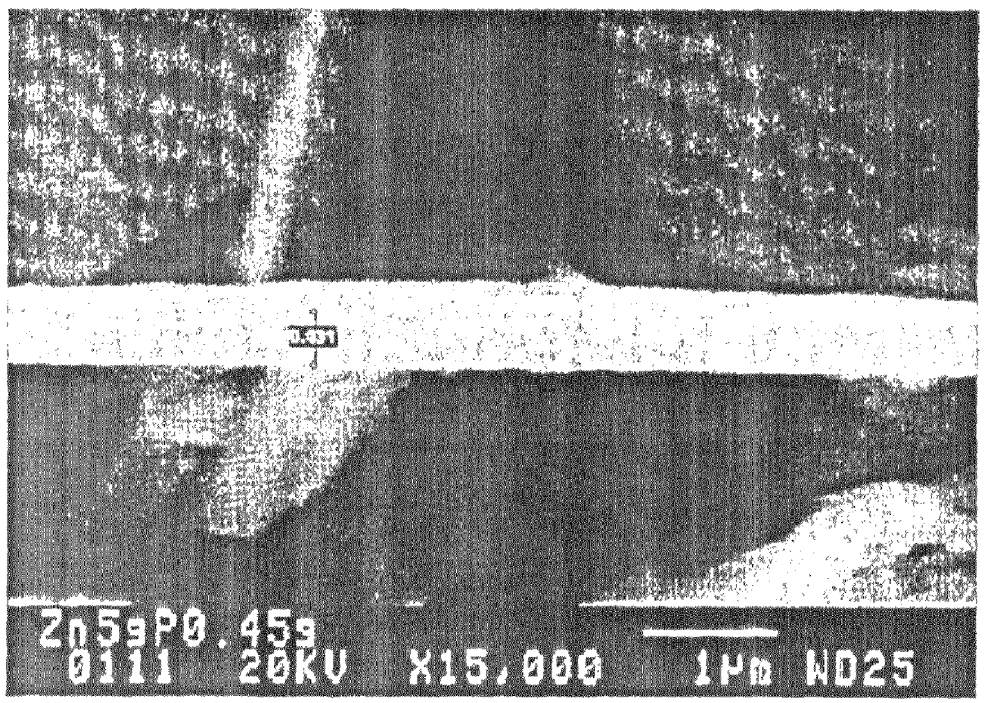
FIG. 7 is the electron micrograph showing the thickness of the flaky α-alumina crystal of Example 5 in accordance with the present invention.

As seen in the electron micrograph of FIG. 6, the resultant flaky α-alumina crystal had a thickness of 0.1-0.3 μm and an average particle size of 16.7 μm. Elemental analysis confirmed that the crystal was comprised of 2.48 parts by weight of zinc oxide.

Thickness and average particle size of the flaky α-alumina crystals prepared in Examples 1-5 are given in Table 1 below.

TABLE 1

|  | Amount of zinc sulfate solution (g) | Thickness (μm) | Average particle size (μm) |
| --- | --- | --- | --- |
| Example 1 | 6 | 0.1-0.3 | 15.6 |
| Example 2 | 12 | 0.1-0.3 | 15.3 |
| Example 3 | 18 | 0.1-0.3 | 18.0 |
| Example 4 | 24 | 0.1-0.3 | 20.5 |
| Example 5 | 30 | 0.1-0.5 | 16.7 |

As seen in Table 1, the flaky α-alumina crystals of the present invention, which were prepared in Examples 1-5, had a thickness ranging from 0.1 to 0.5 μm and an average particle size ranging from 15.3 to 20.5 μm.

Comparative Example 1

A flaky α-alumina crystal was prepared in the same manner as in Example 3 by the conventional solution chemistry method, except for using 18 g of a 35% titanium sulfate $(Ti(SO_4)_2 \cdot nH_2O)$ solution instead of the 35% zinc sulfate solution, omitting the processes of aging after the hydrolysis and calcination prior to the crystallization, while performing dispersion after the crystallization in water at 80° C. instead of the sulfuric acid solution.

Figure 8:
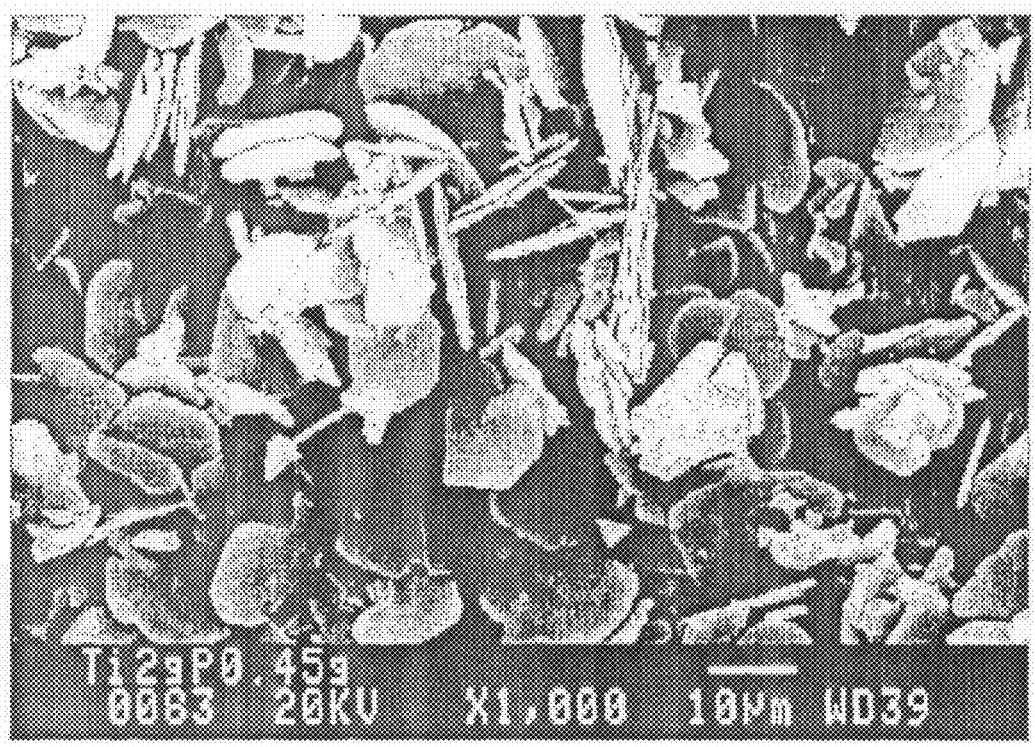
FIG. 8 is the electron micrograph showing the particle shape of the flaky α-alumina crystal of Comparative Example 1 in accordance with the conventional method.
Figure 9:
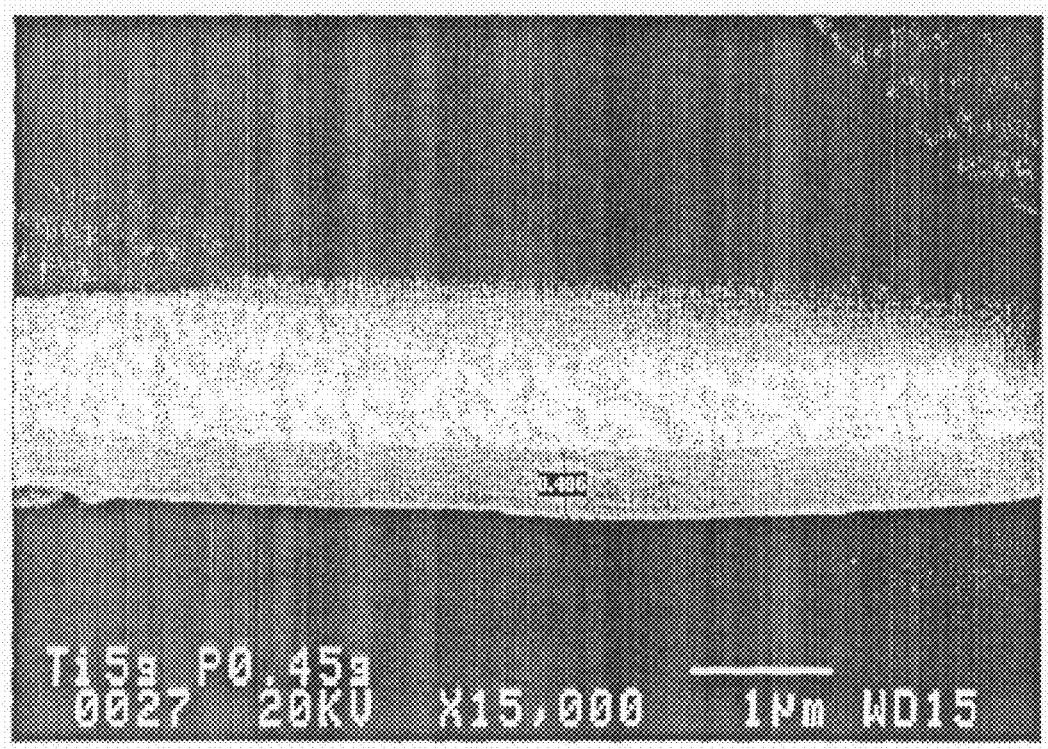
FIG. 9 is the electron micrograph showing the thickness of the flaky α-alumina crystal of Comparative Example 1 in accordance with the conventional method.

As seen in the electron micrographs of FIG. 8 and FIG. 9, the resultant flaky α-alumina crystal had a thickness of 0.3-0.7 μm and an average particle size of 14.6 μm. Elemental analysis showed that the crystal comprised 2.52 parts by weight of titanium oxide. To conclude, the crystal was thicker and had a smaller average particle size compared with those of Examples 1-5, resulting in reduction of aspect ratio and increase in coagulation.

As apparent from the above description, the flaky α-alumina crystal of the present invention comprises aluminum oxide and zinc oxide as main constituents and has a thickness of less than 0.5 μm, an average particle size of at least 15 μm and an aspect ratio of at least 50. Therefore, it is suitable for a high-quality pearlescent pigment and a filler for ceramic materials.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for preparing a flaky α-alumina crystal comprising:
   1) preparing a metal precursor solution containing 0.04-5 parts by weight of a zinc precursor per 100 parts by weight of aluminum precursor;
   2) titrating the metal precursor solution with a sodium salt solution to pH 6.0-7.5 and hydrolyzing it to prepare a gel mixture;
   3) pre-treating said gel mixture by aging it at 60-100° C. for 5-30 hrs followed by drying;
   4) calcining said pre-treated gel mixture at 300-700° C. for 1-5 hrs;
   5) crystallizing said calcined gel mixture at 1,000-1,200° C. for 1-7 hrs to prepare a crystallized cake; and
   6) cooling said crystallized cake to room temperature, dissolving said crystallized cake in 20-90° C. of water and filtering the dissolved crystallized cake to remove the flux and obtain a filtrate, dispersing the filtrate at 20-90° C. in a 0.1-10% sulfuric acid solution and filtering, washing and drying the filtrate to obtain an α-alumina crystal.

2. The method of claim 1, wherein said aluminum precursor is selected from the group consisting of an acid salt, a halide and an oxide of aluminum.

3. The method of claim 1, wherein wherein said zinc precursor is selected from the group consisting of an acid salt, a halide and an oxide of zinc.

4. The method of claim 1, wherein wherein said water-soluble flux is selected from the group consisting of sodium sulfate, potassium sulfate, potassium hydrogen sulfate, sodium borate, potassium nitrate and potassium hydroxide.

5. The method of claim 1, wherein wherein said water-soluble flux is comprised of 80-120 parts by weight per 100 parts by weight of said aluminum precursor.

6. The method of claim 1, wherein said sodium salt is at least one selected from the group consisting of sodium carbonate, sodium hydrogenmonocarbonate, sodium hydroxide and sodium phosphate.

7. The method of claim 1, wherein wherein said water-soluble flux is comprised of 80-120 parts by weight per 100 parts by weight of said aluminum precursor.

* * * * *